United States Patent
Kraemer et al.

(10) Patent No.: US 11,933,105 B2
(45) Date of Patent: Mar. 19, 2024

(54) POSITIONING SYSTEM AND METHOD FOR DETERMINING AN OPERATING POSITION OF AN AERIAL DEVICE

(71) Applicant: IVECO MAGIRUS AG, Ulm (DE)

(72) Inventors: Jens Kraemer, Ulm (DE); Enzo Viola, Elchingen-Thalfingen (DE); Marco Fahlbusch, Ulm (DE)

(73) Assignee: IVECO MAGIRUS AG, Ulm (DE)

( * ) Notice: Subject to any disclaimer, the term of this patent is extended or adjusted under 35 U.S.C. 154(b) by 1069 days.

(21) Appl. No.: 16/305,505

(22) PCT Filed: Jun. 22, 2017

(86) PCT No.: PCT/IB2017/053740
§ 371 (c)(1),
(2) Date: Nov. 29, 2018

(87) PCT Pub. No.: WO2017/221198
PCT Pub. Date: Dec. 28, 2017

(65) Prior Publication Data
US 2020/0325725 A1    Oct. 15, 2020

(30) Foreign Application Priority Data
Jun. 22, 2016 (IT) .................... 102016000064827

(51) Int. Cl.
*E06C 5/34* (2006.01)
*E06C 5/44* (2006.01)
*G01C 3/20* (2006.01)

(52) U.S. Cl.
CPC ............... *E06C 5/34* (2013.01); *E06C 5/44* (2013.01); *G01C 3/20* (2013.01)

(58) Field of Classification Search
CPC .... E06C 5/34; E06C 5/44; G01C 3/20; G01R 29/0892; B66F 11/044; B66F 17/006;
(Continued)

(56) References Cited

U.S. PATENT DOCUMENTS

| | | | | |
|---|---|---|---|---|
| 4,973,216 A | * | 11/1990 | Domm | ............... H05K 13/0812 29/721 |
| 6,633,663 B1 | * | 10/2003 | Slesinger | ........... H05K 13/0812 382/199 |

(Continued)

FOREIGN PATENT DOCUMENTS

| | | |
|---|---|---|
| CA | 2262242 | 8/2000 |
| CN | 102565556 A | 7/2012 |

(Continued)

OTHER PUBLICATIONS

Patent Cooperation Treaty, International Search Report and Written Opinion for International Application No. PCT/IB2017/053740, dated Sep. 26, 2017, 12 pages.

(Continued)

*Primary Examiner* — Hovhannes Baghdasaryan
(74) *Attorney, Agent, or Firm* — KLINTWORTH & ROZENBLAT IP LLP

(57) ABSTRACT

Positioning system for determining an operating position of an aerial device, comprising
a mobile distance metering device configured to determine a distance between the distance metering device and a remote environmental surface point and to record the determined distance as distance data, wherein the distance metering device comprises a transmission interface configured to transmit recorded distance data;
a mobile terminal comprising a receiver interface configured to receive distance data transmitted from the distance metering device, a memory configured to store dimension data related to physical dimensions of an aerial device, processing means configured for calculating a position and/or a position range of the aerial device within a virtual space from the distance data and the dimension data, and a display configured to display
(Continued)

the virtual space comprising a representation of the position and/or the position range of the aerial device within the virtual space.

15 Claims, 2 Drawing Sheets

(58) Field of Classification Search
CPC .... G07C 5/008; G07C 5/0808; G07C 5/0816; H04W 4/14
See application file for complete search history.

(56) References Cited

U.S. PATENT DOCUMENTS

| | | | |
|---|---|---|---|
| 2011/0074604 A1* | 3/2011 | Hsu | B62D 15/0285 340/932.2 |
| 2011/0156928 A1* | 6/2011 | Ghisio | B62D 15/0285 340/932.2 |
| 2012/0147153 A1 | 6/2012 | Lin et al. | |
| 2014/0018195 A1* | 1/2014 | Meadows | A63B 69/36 473/407 |
| 2014/0184749 A1* | 7/2014 | Hilliges | G06T 15/00 348/47 |
| 2016/0117902 A1* | 4/2016 | Baillargeon | G08B 21/182 182/18 |
| 2016/0173740 A1* | 6/2016 | Corby | F16M 11/26 348/148 |
| 2017/0334568 A1* | 11/2017 | Luo | B64D 25/00 |

FOREIGN PATENT DOCUMENTS

| | | | |
|---|---|---|---|
| CN | 102739276 A | | 10/2012 |
| CN | 203011375 U | | 6/2013 |
| CN | 106767504 A | * | 5/2017 |
| DE | 296 12 377 | | 9/1996 |
| DE | 29612377 | | 9/1996 |
| FR | 2 720 438 | | 12/1995 |
| JP | 2006 089265 | | 4/2006 |
| JP | 2007093045 A | * | 4/2007 |

OTHER PUBLICATIONS

European Patent Office, Office Action for Application No. 17739323. 8-1005, dated Mar. 6, 2020, 8 pages.
China National Intellectual Property Administration, Notification of the Second Office Action for Application No. 201780035972.6, dated Jun. 29, 2020, 9 pages.

* cited by examiner

POSITIONING SYSTEM AND METHOD FOR DETERMINING AN OPERATING POSITION OF AN AERIAL DEVICE

CROSS-REFERENCE TO RELATED APPLICATIONS

The present application claims priority to PCT International Application No. PCT/IB2017/053740 filed on Jun. 22, 2017, which application claims priority to Italian Patent Application No. 102016000064827 filed Jun. 22, 2016, the entirety of the disclosures of which are expressly incorporated herein by reference.

STATEMENT RE: FEDERALLY SPONSORED RESEARCH/DEVELOPMENT

Not applicable

TECHNICAL FIELD

The present invention relates to a positioning system for determining an operating position of an aerial device, and to a corresponding method.

BACKGROUND ART

An aerial device of the above kind is, for example, a turnable telescopic ladder of a firefighting vehicle. In a rescue situation, it is important to position the vehicle such that the turnable ladder can reach every desired point to operate in an optimal fashion. However, the ideal working position of the vehicle must be estimated by the driver or other members of the operation crew. The quality of this estimation turns out only after the vehicle is fully secured and the ladder is extracted, and any need for correcting a positioning error of the vehicle loses valuable time. On the other hand, with bad visibility and under the stress conditions of a rescue situation, a reliable estimation of the ideal position of the vehicle is demanding.

To support this estimation, mobile distance metering devices are used as handheld devices for an operator to estimate the operation range of the aerial device first, before the vehicle is positioned at the respective point. Such mobile metering devices are commercially available and use a laser beam to determine a distance between a ground surface point and a remote environmental surface point, for example, an point in an elevated position at a wall of a building. The measured distance is used to determine whether the turnable ladder, when centered in the position from which the distance is measured, will have enough operation space, or whether it will reach the remote elevated point which was targeted by the mobile distance metering device.

Although such mobile metering devices are a helpful tool for determining the ideal operating position, this method is still error-prone and demands much experience and good skills of the operating crew. Another source of errors in the situation described above is the fact that different turnable ladders have a different operation range, and each estimation must be carried out under consideration of the dimension of operation limits of the ladder which is presently used. Another problem lies in the fact that the operation range may depend on the load acting on the tip of the ladder, for example, the number of persons to be carried in a rescue cage mounted at the ladder tip. Taking all circumstances into account, the estimation of the proper operating position is still difficult even for experienced personal.

DISCLOSURE OF INVENTION

It is therefore an object of the present invention to provide a reliable positioning system for determining an operating position of an aerial device which is improved over a system using only a mobile distance metering device and is less error-prone and demanding for the rescue crew.

This object is achieved by a positioning system comprising the features of claim 1, as well as by a method for determining an operating position of an aerial device according to claim 9.

The positioning device according to the present invention comprises a mobile terminal configured to communicate with a mobile distance metering device. Both devices are used within the positioning system according to the present invention. The mobile distance metering device is used in a common way, by a person standing on a ground position to measure a distance to a remote environmental surface point. The determined distance is recorded as distance data, which are transmitted to the mobile terminal. For this purpose a transmission interface of the mobile distance metering device is used, for example, a wireless transmission interface, and the mobile terminal receives this distance data by means of a receiver interface.

The memory of the mobile terminal is used to store dimension data which are related to the physical dimensions of the aerial device. The term "physical dimensions" shall denote the spatial extensions of the aerial device and its possible movements according to its degrees of freedom, describing an operation range of the aerial device, but may also include information about possible loads of the aerial device and/or the dependencies of the limits of the operation range depending on loads acting on the aerial device. Generally speaking, the dimension data describe possible movements of the aerial device within the real environmental space.

Processing means of the mobile terminal, for example, a central processing unit, is configured for calculating a position and/or a position range of the aerial device within a virtual space from the distance data and the dimension data. This virtual space may be a two-dimensional or three-dimensional space representing the real environmental space and the aerial device comprised within the environmental space. The display of the mobile terminal is used to display this virtual space comprising a representation of the position and/or the position range of the aerial device within the virtual space.

A member of the rescue crew may use both devices, i.e. the mobile and portable distance metering device and the mobile and portable terminal at the same time. For finding the operation position of the aerial device, she/he uses the mobile distance metering device to measure the distance to one or more remote environmental surface points. The corresponding distance data are transmitted to the mobile terminal. From these distance data as well as from the dimension data of the aerial device stored within the mobile terminal, the processing means calculates the representation of the position or position range of aerial device at the point from which the distances have been measured. The visual representation on the display is a reliable tool for estimating whether the aerial device will have a good operating position. The whole procedure of determining the operation position can be performed before the vehicle is finally positioned and secured.

According to a preferred embodiment of the present invention, the mobile terminal is further configured to receive dimension data from an external source.

Preferably, the mobile terminal is configured to receive the dimension data by means of a wireless interface of the mobile terminal.

More preferably, the mobile terminal is configured to receive the dimension data by an internet connection. In this embodiment, the dimension data related to the aerial device can be downloaded from an external source, like an internet server. It is possible that the operator of the mobile terminal may choose the type of aerial device from a variety of different aerial devices from which dimension data can be downloaded, and to download a corresponding data set describing the aerial device which is used in the present situation. Thus the system is very flexible and can be adapted to different rescue situations.

According to another preferred embodiment of the present invention, the mobile terminal comprises optical reading means to read an optical data code representing the dimension data, and decryption means to decrypt the optical data code. This optical data code may be, for example, a QR (Quick Response) code attached to an outer surface of the aerial device. The optical reading means may be represented by the camera of the mobile terminal. The optical data code is scanned by the optical reading means and decrypted, for example, by the usual processing means comprised within the mobile terminal. In this embodiment, an external internet connection for downloading the dimension data of the aerial device is not necessary. This embodiment of the positioning system has the advantage that it can be used also at places where no internet connection is available.

More preferably, the transmission interface of the distance metering device and the receiver interface of the mobile terminal are configured to communicate wirelessly via a wireless data transmission standard. Such a standard may be, for example, bluetooth or any other comparable standard for short range communication. It may also provide the advantage that standard interfaces used in commonly available mobile metering devices and mobile terminals can be used for communication between these different devices.

More preferably, the dimension data comprise load limit data indicating a maximum load of the aerial device related to a position of the aerial device and the display is further configured to display load limits related to the represented position and/or position range of the aerial device.

According to another preferred embodiment, the positioning system comprises program means stored within the memory of the mobile terminal and comprising program code means executable by the processing means for calculating a position of the aerial device within the virtual space from the distance data and the dimension data. Such program means may be an application program to be executed on the mobile terminal and which can be operated intuitively by an operator.

A method for determining an operating position of an aerial device according to the present invention is characterized by the following steps:
  positioning a portable mobile distance metering device at a first point within an environmental space,
  determining a distance between the first point and a remote second point within the environmental space by means of the mobile distance metering device,
  recording the determined distance as distance data,
  transmitting the recorded distance data to a mobile portable terminal;
  calculating a virtual space from the received distance data corresponding to the environmental space;
  calculating a position and/or a position range of the aerial device within the virtual space on the basis of dimension data related to physical dimensions of the aerial device;
  generating a visual representation of the aerial device positioning in said position and/or position range within the virtual space, and
  displaying the visual representation on a display of the mobile portable terminal.

Preferably this method further comprises the step of receiving the dimension data from an external source.

More preferably, the dimension data are received via a wireless interface of the mobile terminal.

Even more preferably, the dimension data are received via an internet connection.

According to a preferred embodiment of the present invention, a method comprises the steps of reading an optical data code representing the dimension data, and decrypting the optical data code.

According to another preferred embodiment, the transmission interface of the distance metering device and the receiver interface of the mobile terminal communicate wirelessly via a wireless data transmission standard. This standard may be a bluetooth standard or the like.

More preferably dimension data comprise load limit data indicating a maximum load of the aerial device related to a position of the aerial device, and the visual representation comprises load limits related to the represented position and/or position range of the aerial device.

BRIEF DESCRIPTION OF THE DRAWINGS

The present invention will be elucidated more clearly with respect to preferred embodiments of the present invention, which will be described hereinafter by means of the following figures.

BEST MODE FOR CARRYING OUT THE INVENTION

Figure 1:
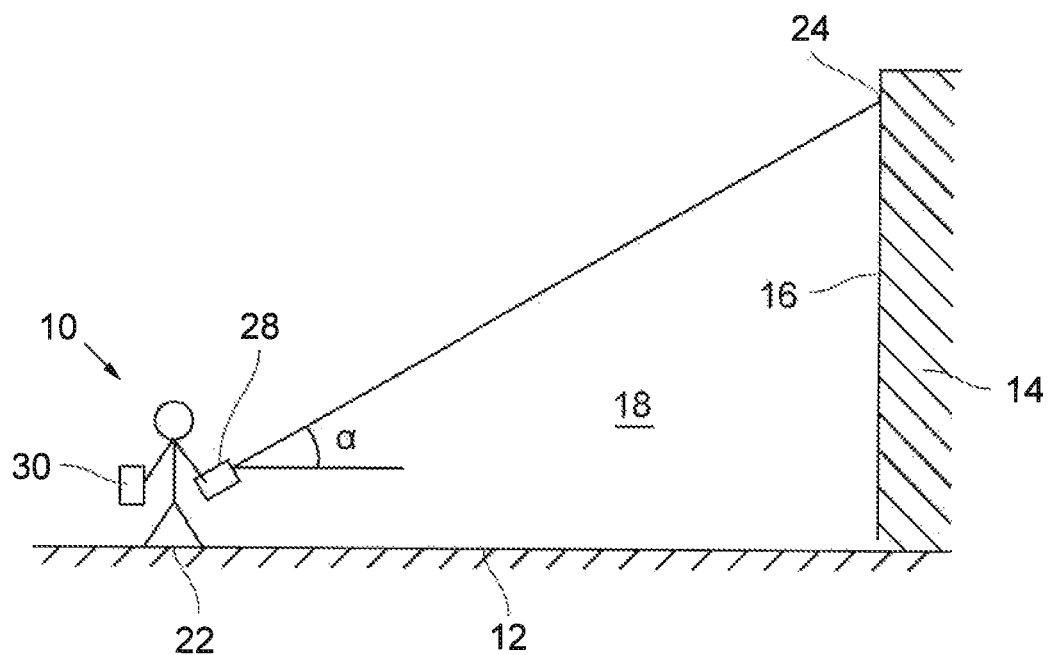
FIGS. 1 and 2 are schematic views demonstrating the use of an embodiment of the positioning system according to the present invention for determining an operating position of an aerial device.

FIG. 1 shows an operator 10 standing on a ground 12 on which a building 14 is located. The horizontal plane of the ground 12 and the vertical wall 16 of the building 14 delimit an environmental space 18 in parts. The operator 10 is confronted with the task to find a suitable operating position of an aerial device 20, which is turnable telescopic ladder on top of a firefighting vehicle. It is noted that the present invention is not limited to this kind of aerial device but can also be applied to other kinds of aerial devices for other purposes. Moreover, it is noted that all elements in the figures are shown schematically under neglection of their relative dimensions.

Figure 2:
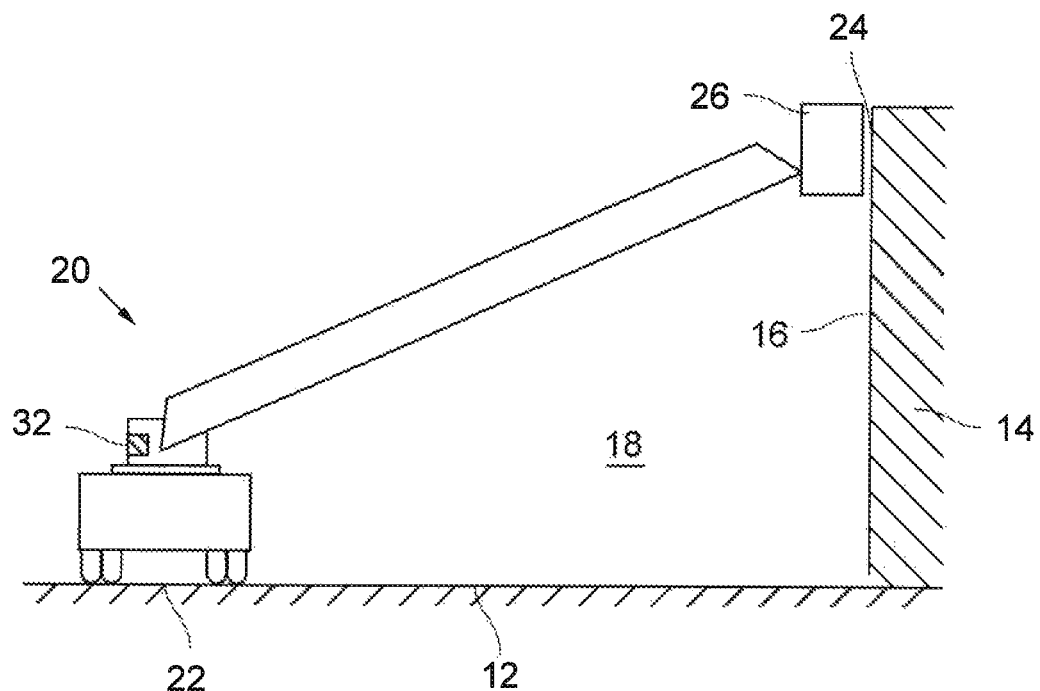

To find the operating position, the operator 10 positions himself at a roughly estimated operation position, from which distance measurements can be taken, as will be described in more detail in the following. The point at which the operator is located is marked as a first point 22 on the ground 12 in FIG. 1. From this first point 22, the operator determines the distance to a remote second point 24 on the surface of the wall 16 of the building 14. The distance between the first point 22 and the second point 24 is used to determine whether the aerial device 20, when located at the first point 22 (FIG. 2), will reach the second point 24 with the top end of the aerial device 20, at which a rescue cage 26 is mounted in the present example.

Therefore, the second point defines a target point to be reached through the aerial device. Further environmental points can be acquired because they define the constraints of the environmental context and can be accounted for calculating the freedom to operate the aerial device during motion to reach the target point.

In the situation in FIG. 1, the operator 10 uses a mobile distance metering device 28 to determine the distance between the distance metering device 28 and the second point 24. The mobile distance metering device 28 is a handheld device to be carried an operated easily. The measured distance corresponds roughly to the distance between the first point 22 and the second point 24. Small deviations caused by holding the mobile distance metering device 28 above the first point 22 have no significant influence of the result of the positioning procedure and can be neglected.

The determined distance between the first point 22 and the second point 24 is recorded within the mobile distance metering device 28 in the form of distance data. These distance data can be transmitted to a mobile terminal 30 by means of a transmission interface incorporated to a mobile distance metering device 28 and a corresponding receiver interface integrated to the mobile terminal 30. The distance data are transmitted wirelessly from the transmission interface of the mobile metering device 28 to the receiver interface of the mobile terminal 30 by using a common wireless data transmission standard, like bluetooth or the like. Any suitable short range transmission standard can be used in the present context.

The mobile terminal 30 may also be a handheld device, namely portable device, like a common smart phone or tablet device, which can be carried and operated easily by the operator 10. The mobile terminal 30 further comprises a memory configured to store dimension data related to physical dimensions of the aerial device. These physical dimensions relate to the physical extension, different degrees of freedom and operating range of the aerial device 20, describing the aerial device 20 as a physical body. Moreover, the dimension data may also comprise data describing operating limits of the aerial device 20 under the consideration of load limit data indicating a maximum load of the aerial device 20 related to its position. As a typical example, the maximum load of the rescue cage 26 at the top end of the aerial device 20 depends on its extension in the horizontal direction, i.e. the horizontal distance from the first point 22 at which the base of the aerial device 20 is located. With other words, the maximum operation range of the aerial device 20 may depend on the load acting at least to the extended portion of the aerial device 20.

These dimension data can be acquired from an external source. According to one embodiment of the present invention, a set of dimension data related to a particular aerial device 20 is represented by a QR (Quick Response) code which is optically readable. This code 32 (FIG. 2) can be applied to an outer surface of the aerial device 20. Optical reading means, like an integrated camera, of the mobile terminal 30 are used to read the optical data code representing the dimension data, and decryption means of the mobile terminal 30 are used to decrypt the optical data code. These decryption means can be represented by the usual processing devices within a common mobile terminal 30, like, a central processing unit or the like. Once the optical data code is decrypted, the corresponding dimension data are stored within the memory of the mobile terminal 30.

Another way of acquiring the dimension data from an external source is, according to a different embodiment, the reception of the dimension data by means of a wireless interface of the mobile terminal, i.e. a remote connection, for example, an internet connection, or a connection to another wireless communication network. For example, the dimension data may be present on an internet server to be downloaded by mobile terminal 30. In this embodiment, an internet connection must be established at the location at which the positioning system is used. Different data sets corresponding to different aerial devices 20 may be present to be downloaded, and the operator may choose one suitable data set from a menu displayed on the mobile terminal 30 to be downloaded.

With the dimension data and the distance data being stored within the memory of the mobile terminal 30, processing means like a CPU of the mobile terminal 30 are used for calculating a position and/or a position range of the aerial device 20 within a virtual space corresponding to the environmental space 18. With other words, physical bodies like the building 14 within the real environmental space 18 are represented by data within the virtual space, as well as the aerial device 20 positioned within the environmental space located at the first point 22 being represented within the virtual space. The relative positions of the aerial device 20 and physical bodies (for example, the building 14) restrict the operability of the aerial device 20, which corresponds to its position range. From this virtual representation possible collision areas can be derived. Moreover, this virtual representation indicates whether the aerial device 20 reaches a desired point, for example, the second point 24 at the building 14. If the desired point can be reached, the operating position by the first point 22 may be regarded as suitable for positioning the aerial device 20.

A display of the mobile terminal 30 is used to display this virtual space comprising a representation of the position and/or the position range of the aerial device 20 within the virtual space. From this virtual representation, the operator can visually perceive whether the operating position is correct or not, i.e. the desired point can be reached, or whether problems like collisions with physical objects within the real environmental space 18 may arise. If the operator judges the present position as not suitable as an operated position, he may correct his position on the ground 12, i.e. the first point 22 may be changed, and the procedure for determining the operating position is repeated. It is noted that the procedure can be performed in relatively short time, such that a correction of the operating position does not lose too much valuable time in a rescue situation. This is an advantage compared to state of the art methods in which the vehicle carrying the aerial device must be re-positioned to correct the real operating position, which is very time consuming because of all securing and safety procedures necessary to use the aerial device 20. The present invention rather proposes to perform the procedure of determining the correct operating position in advance from a chosen point 22, before the vehicle carrying the aerial device 20 is positioned at that point 22.

It is further possible that the display of the mobile terminal 30 displays load limits related to the represented position and/or position range of the aerial device, such that the operator 10 may judge whether the aerial device 20 may carry sufficient load (i.e. a desired number of persons present in the rescue cage 20 in the present example) at a desired extension. This is another helpful information for positioning the aerial device 20 correctly.

It is noted that the procedure of receiving dimension data from an external source (download from the internet, reading a QR code or the like) may be performed by the operator 10 via an application program means stored within the memory of the mobile terminal 30, which comprises program code means that can be executed by suitable processing means, like the CPU of the mobile terminal 30, for calculating the position of the aerial device 20 within the virtual space.

Figure 3:
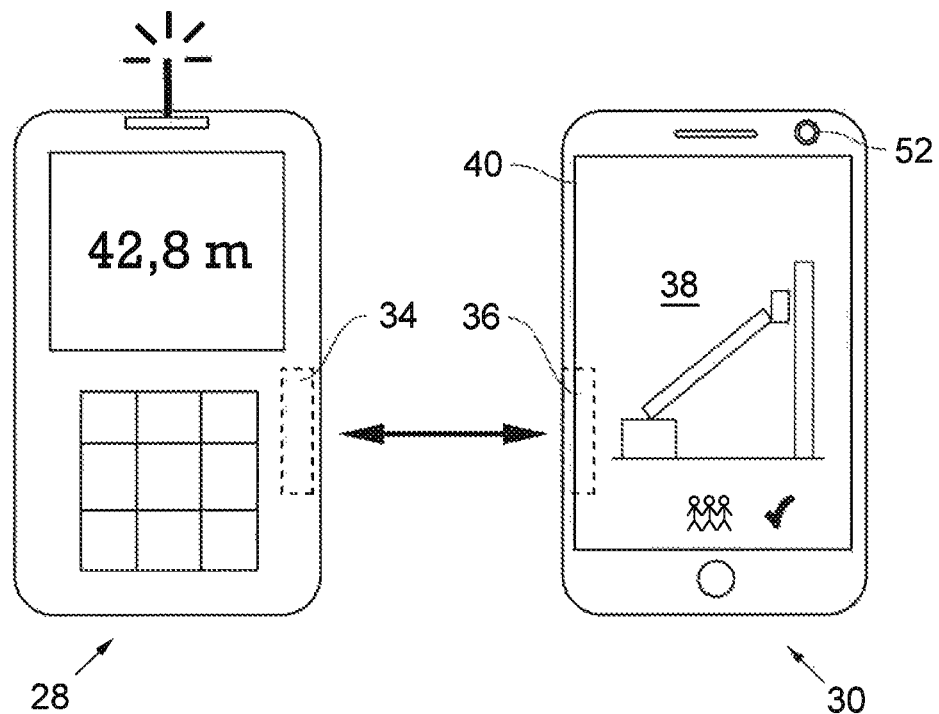
FIGS. 3 and 4 are further schematic view of a mobile distance metering device and a mobile terminal as components of the embodiment of the position system shown in FIGS. 1 and 2.

FIG. 3 shows the mobile distance metering device 28 and a mobile terminal 30 schematically. As described above, both devices 28, 30 communicate via a transmission interface 34 of the mobile distance metering device 28 and a corresponding receiver interface 36 of the mobile terminal 30 wirelessly, for example, via bluetooth or another wireless data transmission standard. For the transmission of the distance data, the connection between the transmission interface 34 and the receiver interface 36 may be one-directional. In most cases a bidirectional communication may be established such as to send query commands, status information etc. to be interchanged between both devices 28, 30. The virtual space 38 comprising the representation of the position and the position range of the aerial device 20 within is shown on the display 40 of the mobile terminal 30.

Figure 4:
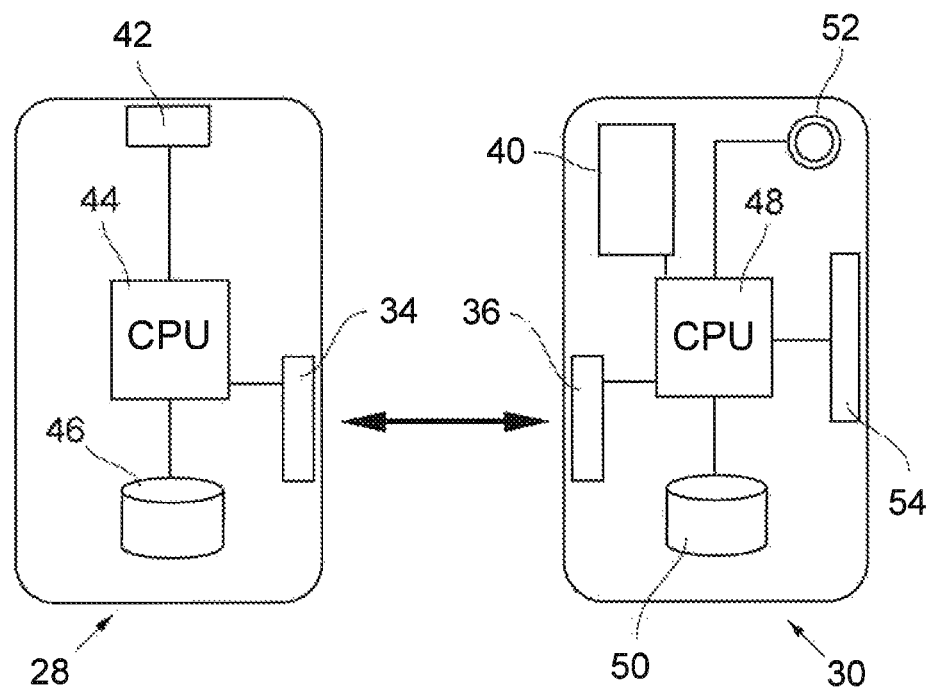

Different components of the distance metering device 28 and the mobile terminal 30 are also shown schematically in FIG. 4. The distance metering device 28 comprises, in the present embodiment, a laser device 42 for emitting a laser beam and receiving a corresponding reflection or scattering light signal, a central processing unit (CPU) 44, a memory 46 and the transmission interface 34. Distance data acquired from a measurement of a laser device 42 are calculated by the CPU 44, stored in the memory 46 and transmitted via the transmission interface 34 wirelessly to the receiver interface 36 of the mobile terminal 30.

The mobile terminal 30 for itself comprises a central processing unit (CPU) 48, a memory 50, a camera 52 and a display 40. It further comprises a second interface 54 for establishing a connection with another wireless network, like the internet. With the mobile terminal 30 demonstrated in FIG. 4, both reading an optical data code representing the dimension data as well as downloading the dimension data from the internet via the second interface 54 is possible. A corresponding application program may be stored within the memory 50 to be executed by the CPU 48.

It is noted that the mobile distance metering device 28 can also be provided for determining an elevation angle α (FIG. 1) of the direct connection line between the operator 10 at the first point 22 and the second point 24 at the wall 16 of the building 14. This elevation angle α may also be included into the distance data, or transmitted together with the distance data via the transmission interface 34 of the mobile distance metering device 28 to the mobile terminal 30 and used for calculating the virtual space corresponding to the real environmental space 18.

The invention claimed is:

1. Positioning system for determining where to position a vehicle in an environmental space, wherein the vehicle carries an extendible aerial device, comprising:
a computer-implemented portable mobile distance metering device remote from the vehicle, positioned proximate a selected first position, and configured to determine using a first processor a distance between the distance metering device and a selected remote surface point in the environmental space and to record the determined distance as distance data, wherein the distance metering device comprises a transmission interface configured to transmit recorded distance data; and
a computer-implemented mobile terminal remote from the vehicle and the distance measuring device and comprising:
a receiver interface operating on a second processor configured to receive distance data transmitted from the distance metering device,
a memory configured to store dimension data related to physical dimensions of a plurality of aerial devices,
processing means implemented by the second processor configured for receiving a selection of an aerial device from the plurality of aerial devices, loading from the memory dimension data associated with the selected aerial device, and calculating a second position and/or a position range of a representation of the selected aerial device within a virtual space from the distance data and the dimension data, and
a display configured to display the virtual space comprising the representation of the selected aerial device at the second position and/or position range within the virtual space and extended to a representation of the remote surface point thereby indicating if the selected aerial device can be fully accommodated in the environmental space between the selected first position and the remote surface point taking into consideration the available space between the selected first position and the remote surface point and the physical dimensions of the selected aerial device, wherein the second position and/or the position range is calculated before the vehicle is positioned at the first position in the environmental space;
wherein the dimension data comprise load limit data indicating different maximum loads of the aerial device related to positions of the selected aerial device, and the display is further configured to display a maximum load that may be carried by the selected aerial device when extended to the remote surface point.

2. Positioning system according to claim 1, characterized in that the mobile terminal is further configured to receive dimension data from an external source.

3. Positioning system according to claim 2, characterized in that the mobile terminal is configured to receive the dimension data by means of a wireless interface of the mobile terminal.

4. Positioning system according to claim 2, characterized in that the mobile terminal is configured to receive the dimension data by an Internet connection.

5. Positioning system according to claim 2, characterized in that the mobile terminal comprises optical reading means to read an optical data code representing the dimension data, and decryption means to decrypt the optical data code.

6. Positioning system according to claim 1, characterized in that the transmission interface of the distance metering device and the receiver interface of the mobile terminal are configured to communicate wirelessly via a wireless data transmission standard.

7. Positioning system according to claim 1, characterized by program means stored within the memory of the mobile terminal and comprising program code means executable by the processing means for calculating a position of the selected aerial device within the virtual space from the distance data and the dimension data.

8. Method for determining where to position a vehicle in an environmental space wherein the vehicle carries an extendible aerial device, characterized by the following steps:

before the vehicle is deployed to a selected first position:

positioning a computer-implemented mobile distance metering device proximate the first position within the environmental space wherein the mobile distance metering device is remote from the vehicle;

determining a distance between the distance metering device and a selected remote surface point within the environmental space by means of the mobile distance metering device;

recording the determined distance as distance data and transmitting the recorded distance data to a computer-implemented mobile terminal, wherein the mobile terminal is remote from the vehicle and the distance metering device;

receiving by a processor of the mobile terminal a selection of an aerial device from a plurality of aerial devices;

retrieving by the from a memory dimension data related to physical dimensions of the selected aerial device;

calculating using a processor a virtual space from the received distance data corresponding to the environmental space;

calculating using the processor a second position and/or a position range of a representation of the aerial device within the virtual space on the basis of the dimension data;

generating using the processor a visual representation of the virtual space, wherein the visual representation comprises the representation of the selected aerial device at the second position and/or the position range in the virtual space and wherein the visual representation further comprises a representation of the selected aerial device extended from the second position and/or position range to a representation of the selected remote surface point and thereby indicating if the selected aerial device can be fully accommodated in the environmental space between the selected first position and the remote surface point taking into consideration the available space between the selected first position and the remote surface point and the physical dimensions of the selected aerial device; and displaying the visual representation on a display of the mobile terminal;

wherein the dimension data comprise load limit data indicating different maximum loads of the selected aerial device related to positions of the selected aerial device, and the visual representation comprises a maximum load that may be carried by the selected aerial device when extended to the remote surface point.

9. Method according to claim 8, characterized by the step of receiving the dimension data from an external source.

10. Method according to claim 9, characterized in that the dimension data are received via a wireless interface of the mobile terminal.

11. Method according to claim 9, characterized in that the dimension data are received via an Internet connection.

12. Method according to claim 8, characterized by the steps of reading an optical data code representing the dimension data, and decrypting the optical data code.

13. Method according to claim 8, characterized in that the transmission interface of the distance metering device and the receiver interface of the mobile terminal communicate wirelessly via a wireless data transmission standard.

14. Positioning system according to claim 1, characterized in that the mobile terminal comprises an optical reader and the processing means is configured to receive the selection of the aerial device by decrypting an optical data code scanned by the optical reader.

15. Method according to claim 8, wherein receiving a selection of the aerial device comprises the steps of optically reading an optical data code and decrypting the optical data code.

* * * * *